US008666450B2

(12) United States Patent
Huang et al.

(10) Patent No.: US 8,666,450 B2
(45) Date of Patent: Mar. 4, 2014

(54) ANTENNA AND MULTI-INPUT MULTI-OUTPUT COMMUNICATION DEVICE USING THE SAME

(75) Inventors: Hsiao-Ting Huang, Taichung County (TW); Shao-Chin Lo, Hsinchu County (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 520 days.

(21) Appl. No.: 12/983,861

(22) Filed: Jan. 3, 2011

(65) Prior Publication Data

US 2011/0274146 A1 Nov. 10, 2011

Related U.S. Application Data

(60) Provisional application No. 61/332,783, filed on May 9, 2010.

(51) Int. Cl.
*H04M 1/00* (2006.01)

(52) U.S. Cl.
USPC ........................................ 455/562.1; 343/702

(58) Field of Classification Search
USPC ............. 455/562.1, 575.7; 370/328; 375/267, 375/219; 343/702
See application file for complete search history.

(56) References Cited

U.S. PATENT DOCUMENTS

| | | | | |
|---|---|---|---|---|
| 7,493,143 | B2 * | 2/2009 | Jalali | 455/562.1 |
| 8,099,131 | B2 * | 1/2012 | Rofougaran | 455/562.1 |
| 8,259,834 | B2 * | 9/2012 | Rofougaran | 375/267 |
| 8,358,248 | B2 * | 1/2013 | Shtrom | 343/702 |
| 8,390,518 | B2 * | 3/2013 | Haustein et al. | 343/700 MS |
| 2002/0132600 | A1 * | 9/2002 | Rudrapatna | 455/277.1 |
| 2002/0164954 | A1 * | 11/2002 | Jalali | 455/67.1 |
| 2010/0289705 | A1 * | 11/2010 | Shtrom et al. | 343/702 |
| 2012/0275499 | A1 * | 11/2012 | Anreddy et al. | 375/219 |
| 2013/0044650 | A1 * | 2/2013 | Barker et al. | 370/278 |
| 2013/0094554 | A1 * | 4/2013 | Kennard | 375/222 |

* cited by examiner

*Primary Examiner* — Lewis West
(74) *Attorney, Agent, or Firm* — Winston Hsu; Scott Margo

(57) ABSTRACT

A antenna for transmitting radio signals of a lower frequency and a higher frequency includes a driven element comprising two first radiating units for a lower frequency band and two radiating units for a higher frequency band, and a reflector element comprising a first reflecting unit for the lower frequency band and a second reflecting unit for the higher frequency band. The second radiating units are disposed at a side of the first radiating units and respectively coupled to a corresponding first radiating unit. The first reflecting unit is disposed at the other side of the first radiating units, and the second reflecting unit is disposed between the first radiating units and the first reflecting unit.

17 Claims, 9 Drawing Sheets

ANTENNA AND MULTI-INPUT MULTI-OUTPUT COMMUNICATION DEVICE USING THE SAME

CROSS REFERENCE TO RELATED APPLICATIONS

This application claims the benefit of U.S. Provisional Application No. 61/332,783, filed on May 9, 2010 and entitled "ANTENNA STRUCTURE AND TRANSCEIVER USING THE SAME", the contents of which are incorporated herein.

BACKGROUND OF THE INVENTION

1. Field of the Invention

The present invention relates to an antenna for transmitting radio signals of a first frequency and a second frequency and a multi-input multi-output (MIMO) communication device using the same, and more particularly, to a microstrip dual-band antenna including a reflector element for multiple frequency bands and MIMO communication device using a switched-beam antenna which is composed of the microstrip dual-band antenna.

2. Description of the Prior Art

Multiple-input multiple-output (MIMO) technology utilizes antenna array to receive and transmit signals, which significantly increases data throughput and coverage without additional bandwidth or transmit power, and thus plays an important part of modern wireless communication standards such as IEEE 802.11n, WiMax and 3GPP Long Term Evolution (LTE). In order to satisfy the market demand for portable communication devices, microstrip antennas (also known as printed antennas) are widely used in all kinds of portable communication devices due to merits of light weight, small size and high compatibility with various circuits.

In a MIMO communication device, dipole antennas can be preferably formed as a switched-beam antenna for realizing antenna diversity. However, dipole antennas cannot carry out high isolation and lower interference among MIMO ports since they are omni-directional. Directional Yagi-Uda antennas can be used instead. Please refer to FIG. 1, which is a schematic diagram of a microstrip Yagi-Uda antenna 10 according to the prior art. The Yagi-Uda antenna 10 consists of a driven element 100 as a dipole antenna and a reflector element 102. In another example of the Yagi-Uda antenna, at least one director element may be added in front of the driven element to increase antenna directionality and gain in the preferred direction. However, conventional Yagi-Uda antennas are mostly made for single-band systems and do not meet multi-band requirements in current multi-band MIMO communication devices.

Please refer to FIG. 2, which is a schematic diagram of a 2×2 MIMO communication device 20 according to the prior art. The MIMO communication device 20 includes a signal processing unit 200, RF transceivers 202 and 204, antennas A1-A6 in parallel and a switching circuit 206 including diodes as single-pole single-throw (SPST) switches for selecting antennas to be used to achieve desired performance. However, different number of antennas that are turned on generates different antenna impedance, which increases the complexity of impedance matching and may have an influence on transmission efficiency.

Therefore, a multi-band, switched-beam antenna is foreseen to be a key component of a multi-band MIMO communication device, e.g. an IEEE 802.11n wireless access point supporting 2.4 GHz band and 5 GHz band, and the problem resulted from using SPST switches to select antennas need to be improved.

SUMMARY OF THE INVENTION

It is therefore an object of the present invention to provide an antenna for transmitting radio signals of a first frequency and a second frequency and a MIMO communication device using the antenna.

The present invention discloses a antenna for transmitting radio signals of a first frequency and a second frequency includes a driven element comprising two first radiating units for radiating radio signals of the first frequency band and two second radiating units for radiating radio signals of the second frequency band higher than the first frequency band, and a reflector element comprising a first reflecting unit for reflecting radio signals of the first frequency band and a second reflecting unit for reflecting radio signals of the second frequency band. The first radiating units are symmetrical with respect to a center axis of the antenna and are respectively extending along a first direction and a second direction opposite to the first direction. The second radiating units are disposed at a side of the first radiating units and are respectively coupled to a corresponding first radiating unit. Similarly to the first radiating units, the second radiating units are also symmetrical with respect to the center, respectively extending along the first direction and the second direction. The first reflecting unit is disposed at the other side of the first radiating units, and the second reflecting unit is disposed between the first radiating units and the first reflecting unit.

The present invention further discloses a MIMO communication device including a MIMO communication device including a signal processing unit, a plurality of RF transceivers, a switched-beam antenna and a plurality of first switches. Note that, the switched-beam antenna is composed of the antenna which transmits radio signals of a first frequency and a second frequency according to the present invention. The antenna may be a dual band antenna. The plurality of RF transceivers are coupled to the signal processing unit and utilized for processing baseband signals generated from the signal processing unit and thereby generating RF signals. The plurality of first switches are respectively coupled to the plurality of RF transceivers, and each first switch is utilized for selectively coupling a corresponding RF transceiver to an antenna in one of the plurality of antenna groups.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
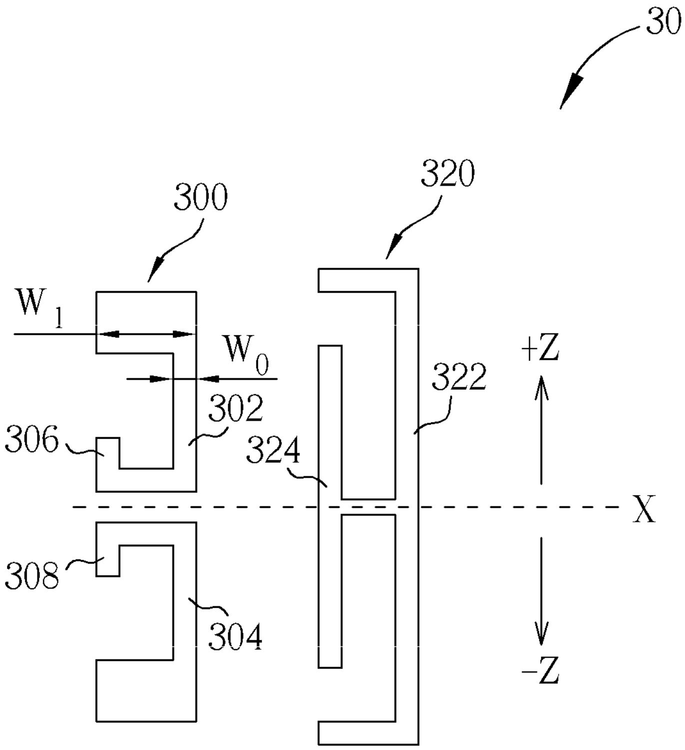
FIG. 3 is a schematic diagram of an antenna according to an embodiment of the present invention.

Please refer to FIG. 3, which is a schematic diagram of an antenna 30 according to an embodiment of the present invention. The antenna 30 is a microstrip Yagi-Uda antenna and comprises a driven element 300 as a dual-band dipole antenna and a reflector element 320, which are symmetrical with respect to a center axis of the antenna 30, denoted as X axis. The driven element 300 comprises radiating units 302, 304, 306 and 308; the radiating units 302 and 304 are utilized for a lower frequency band and the radiating units 306 and 308 are utilized for a higher frequency band, such as for 2.4 GHz band and 5 GHz band under IEEE 802.11n. The reflector element 320 comprises reflecting units 322 and 324; the reflecting units 322 is utilized for reflecting radio signals of the lower frequency band and the reflecting units 324 is utilized for reflecting radio signals of the higher frequency band.

First note that, the reflecting unit 322 does not reflect only lower frequency radio signals but also higher frequency radio signals. However, the reflecting unit 324 is considered necessary and can greatly contribute to high frequency gain and antenna directionality when operating in the higher frequency band.

The radiating unit 302 and the radiating unit 306 are coupled, and the radiating unit 304 and the radiating unit 308 are coupled. The radiating units 302 and 304 are symmetrical with respect to X axis, and so are the radiating units 306 and 308. The radiating units 302 and 304 are respectively extending along opposite directions perpendicular to the center axis X, denoted as +Z and −Z directions, and so are the radiating units 306 and 308. The radiating units 306 and 308 are disposed at the left side of the radiating units 302 and 304. In the following descriptions, the wavelength of the center frequency of the lower frequency band is denoted as $\lambda_1$, and the wavelength of the center frequency of the higher frequency band is denoted as $\lambda_2$. Since the driven element 300 is a half-wavelength dipole antenna, the length of the radiating unit 302 or the radiating unit 304 is approximate to $\frac{1}{4}\lambda_1$, and the length of the radiating unit 306 or the radiating unit 308 is approximate to $\frac{1}{4}\lambda_2$. The width of the radiating unit 302 or the radiating unit 304 can be different along the extending direction. As an example of FIG. 3, the radiating unit 302 is regarded as a combination of two portions; one portion close to X axis having a width $W_0$ and the other portion far from X axis having a width $W_1$ larger than $W_0$, and so does the radiating unit 304.

One symmetrical half of the driven element 300, which is the radiating unit 302 in combination with the radiating unit 304 or the radiating unit 306 in combination with the radiating unit 308, is utilized for radiating radio signals of the lower frequency band and the higher frequency band and may be connected to a signal feeding line, e.g. a microstrip line or an inner conductor of a coaxial cable. The other symmetrical half of the driven element 300 is utilized as a reference ground, which may be connected to a system ground of a system using the antenna 30 though vias on a printed circuit board or an outer conductor of a coaxial cable.

The reflecting unit 322 is disposed at the right side of the radiating units 302 and 304. The reflecting unit 324 is disposed between the radiating units 302 and 304 and the reflecting unit 322. The reflecting units 322 and 324 are also respectively extending along +Z and −Z directions. The length of the reflecting unit 322 is larger than $\frac{1}{2}\lambda_1$, and the length of the reflecting unit 324 is larger than $\frac{1}{2}\lambda_2$. The reflecting units 322 and 324 also have to be coupled to a system ground. As shown in FIG. 3, the reflecting units 322 and 324 are directly coupled at the center. However, the coupling relationships of the reflecting units 322 and 324 as in FIG. 3 is only an embodiment and is not a must since the reflecting units 322 and 324 finally have to be coupled to a system ground.

Figure 4C:
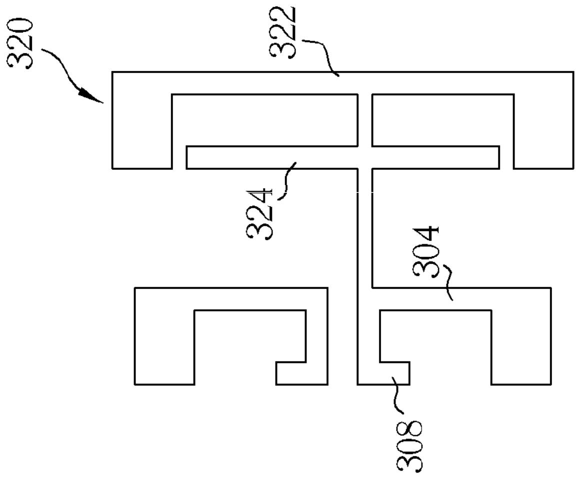
FIG. 4A to FIG. 4C are variation embodiments of the antenna of FIG. 3.
Figure 4B:
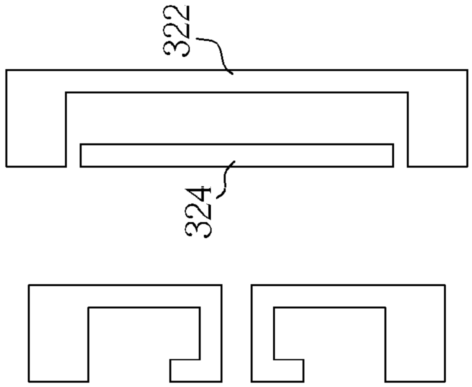
Figure 4A:
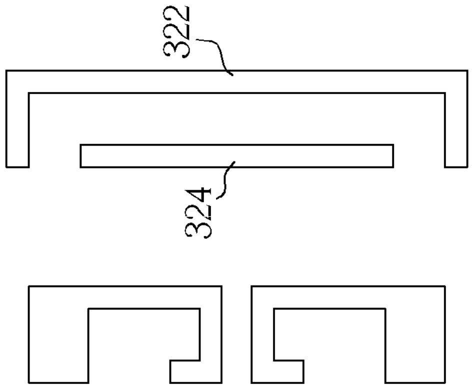

Please refer to FIGS. 4A, 4B and 4C, which are variation embodiments of the antenna 30 of FIG. 3. In FIG. 4A, there is no coupling at the center of the reflecting unit 322 and the reflecting unit 324. In FIG. 4B, two ends of the reflecting unit 322 along +Z and −Z directions are wider than the other part of the reflecting unit 322, similar to the case of the radiating units 302 and 304. In other words, the reflecting unit 322 can be regarded as including two symmetrical portions with respect to the center axis, X axis, and the end of each portion far from X axis has a width larger than the other end of the portion close to X axis has. The reflecting unit 322 of FIG. 4B improves the reflection of radio signals of the lower frequency band. In FIG. 4C, the reflecting unit 322, the reflecting unit 324, the radiating unit 304 and the radiating unit 308 are coupled and are all connected to a system ground, which helps with a wider bandwidth of the lower frequency band.

Please refer to FIG. 3. For an implementation of the antenna 30, the distance between the reflecting unit 322 and the radiating unit 302 (for the lower frequency band) can be $0.16\lambda_1$, which is the distance to obtain the maximum antenna gain, and the distance between the reflecting unit 322 and the radiating unit 304 (for the higher frequency band) can be $0.43\lambda_2$. Thus, the distance between the reflecting unit 324 and the radiating unit 304 can be $0.36\lambda_2$. Since the distance between the reflecting unit 322 and the radiating unit 304 is much longer than the preferred distance, the reflecting unit 322 cannot help with the antenna gain when operating in the higher frequency band. For this reason, the reflecting unit 324 is necessary.

Figure 5A:
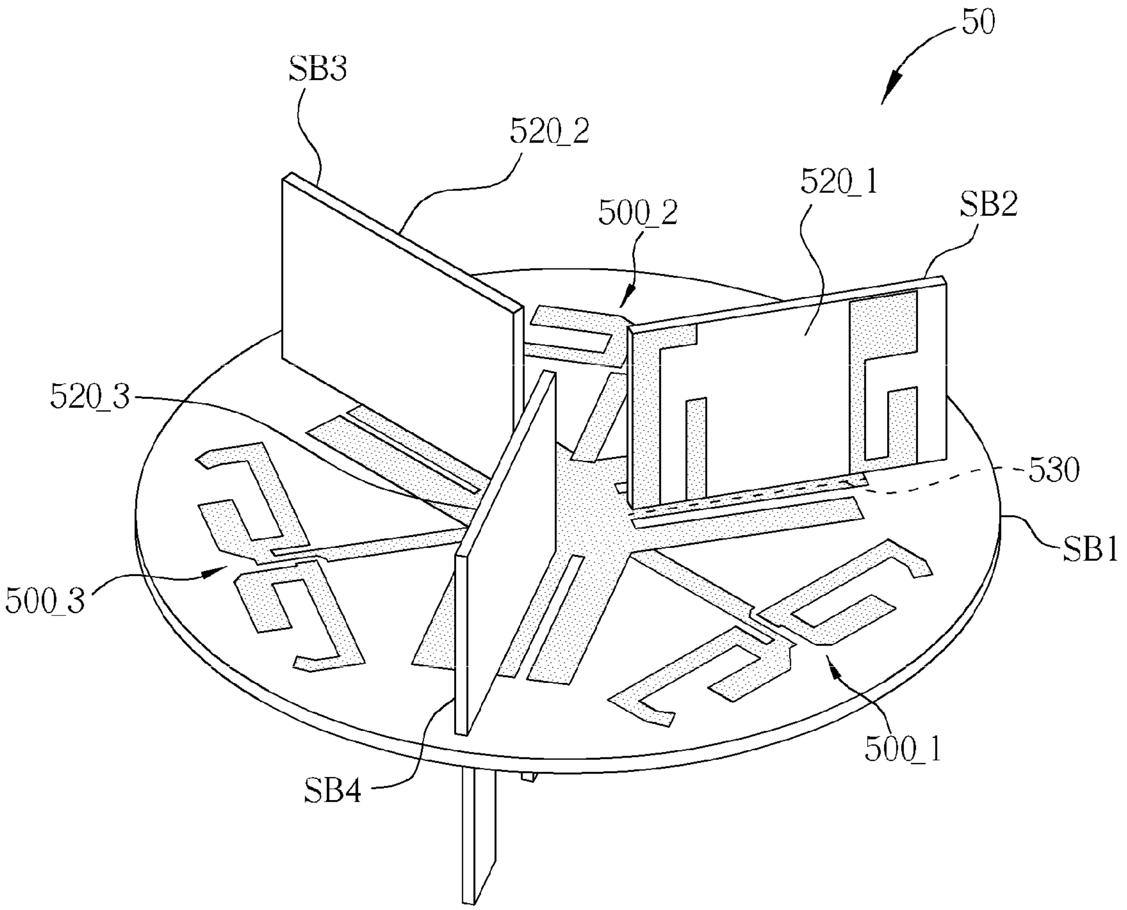
FIG. 5A is a top isometric view of a switched-beam antenna according to an embodiment of the present invention.

Furthermore, the antenna 30 can be utilized for forming a switched-beam antenna to be used in a multi-input multi-output (MIMO) communication device. Please refer to FIG. 5A and FIG. 5B, which are respectively a top isometric view and a bottom isometric view of a switched-beam antenna 50 according to an embodiment of the present invention. The switched-beam antenna 50 is composed of six microstrip antennas, including three horizontal-polarized antennas 500_1-500_3 for transmitting and receiving horizontal-polarized radio signals, and three vertical-polarized antennas 520_1-520_3 for transmitting and receiving vertical-polarized radio signals. Each of the vertical-polarized antennas 520_1-520_3 is similar to the antenna 30 of FIG. 3 and is not repeated herein. Each of the horizontal-polarized antennas 500_1-500_3 is a variation of the antenna 30, which has a reflector element slight different from that of the antenna 30 of FIG. 3, given more details as follows.

The horizontal-polarized antennas 500_1-500_3 are disposed on a substrate SB1, which is preferably a circular substrate typically including 2 layers at least, for minimizing dimensions of the switched-beam antenna 50. Thus, the switched-beam antenna 50 is suitable for a wireless communication device having a limited size, such as a portable WLAN access point. The horizontal-polarized antennas 500_1-500_3 are arranged to form a circle and equally divides the circle into three 120-degree sectors.

Figure 5B:
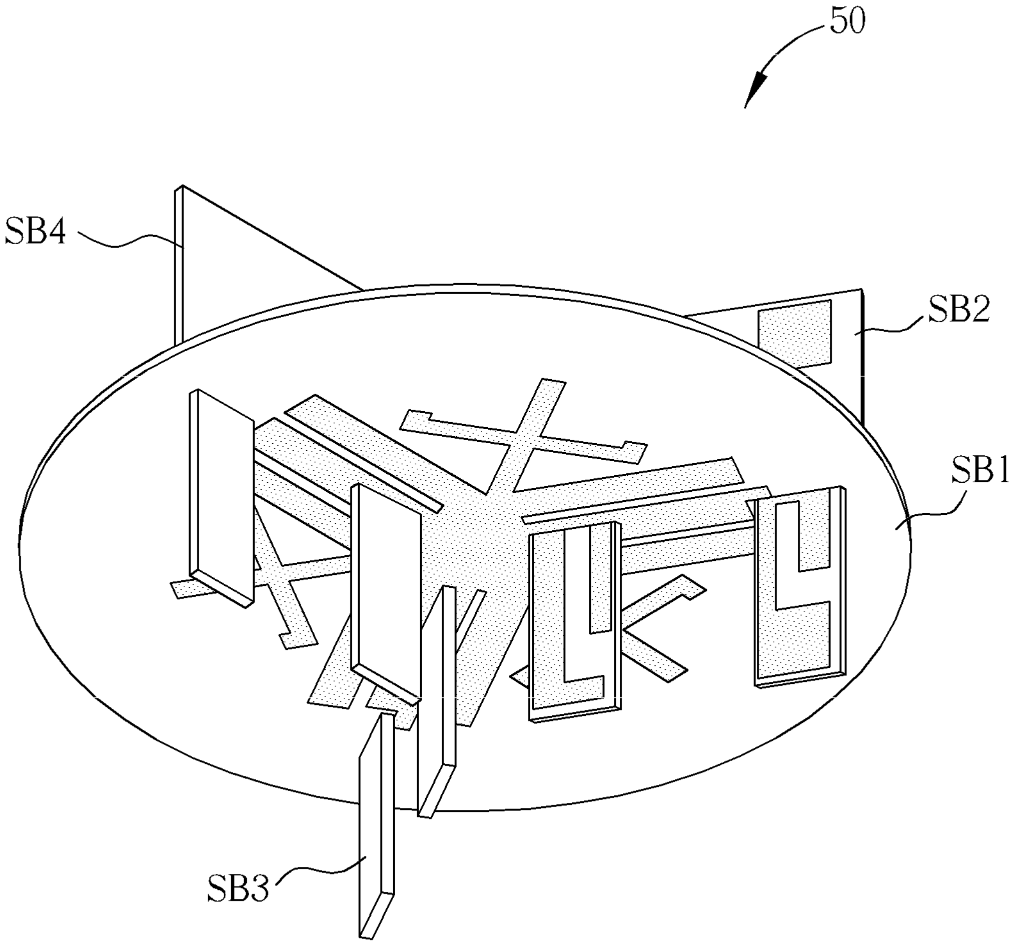
FIG. 5B is a bottom isometric view of the switched-beam antenna of FIG. 5.

The vertical-polarized antennas 520_1-520_3 are respectively disposed on substrates SB2-SB4, which are perpendicularly interlocked with the substrate SB1, spaced apart by the substrate SB1 (as shown in FIG. 5B). The vertical-polarized antennas 520_1-520_3 are interlaced with the horizontal-polarized antennas 500_1-500_3 to realized 360-degree coverage. A signal feeding line 530 (shown as a dashed line) is disposed on the substrates SB1 for transmitting vertical-polarized radio signals to the vertical-polarized antennas 520_1, and exposed pads of the signal feeding line 530 and the radiating unit of vertical-polarized antennas 520_1 are required to connect the signal feeding line 530 and the vertical-polarized antenna 520_1. So do the vertical-polarized antennas 520_2 and 520_3.

Figure 6A:
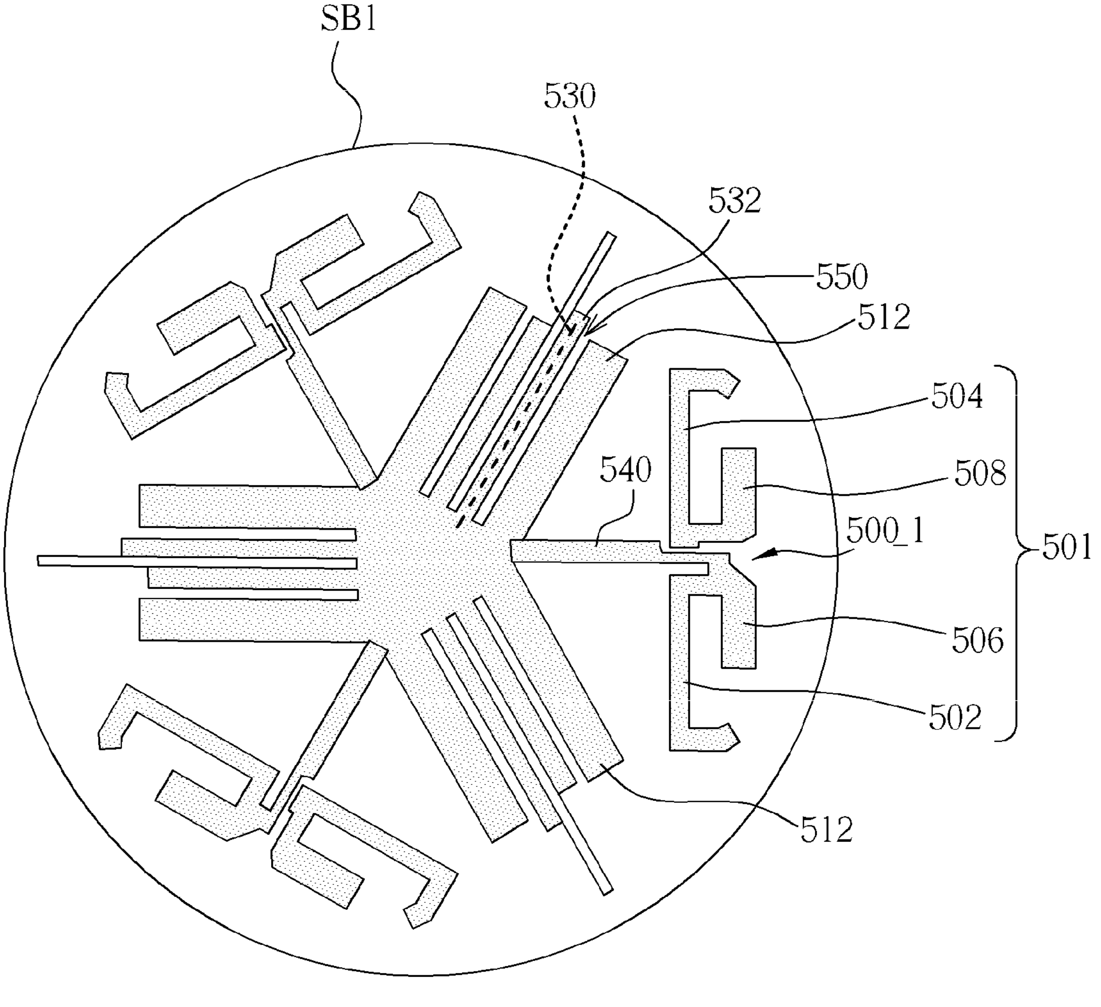
FIG. 6A is a schematic diagram of a top layer of a horizontal substrate of the switched-beam antenna of FIG. 5
Figure 6B:
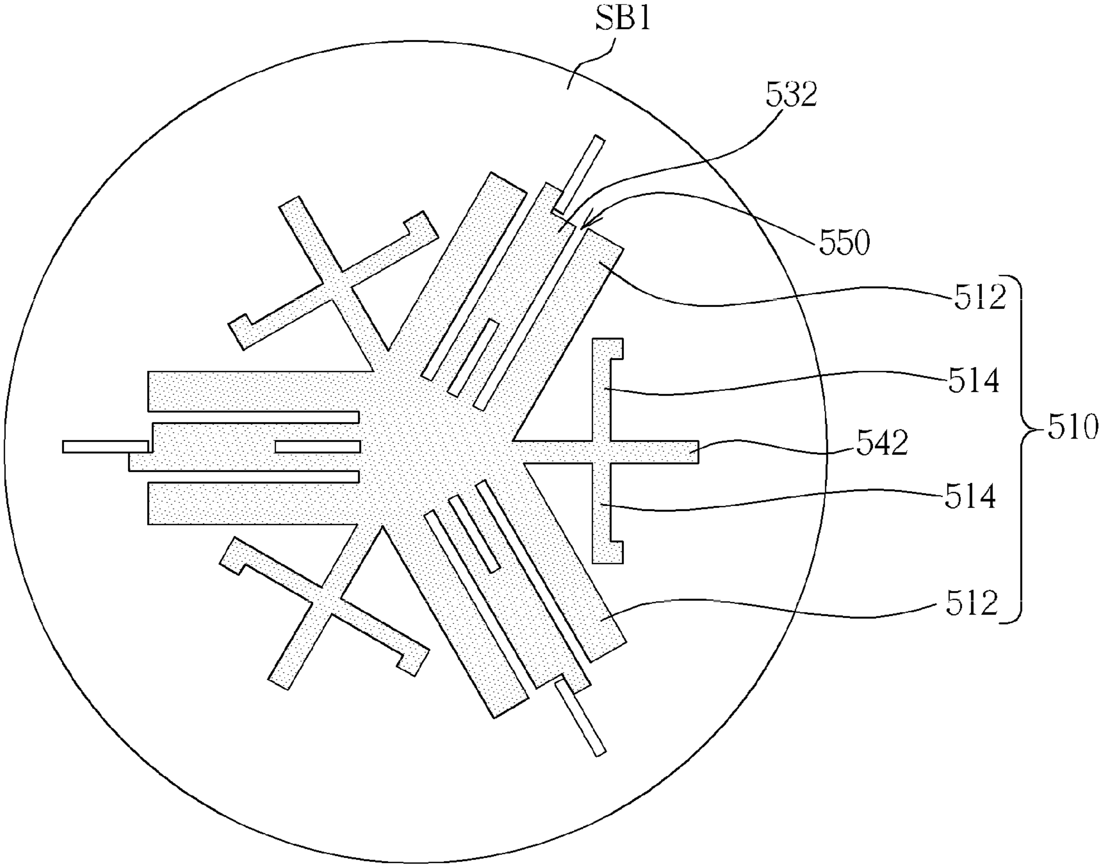
FIG. 6B is a schematic diagram of a bottom layer of a horizontal substrate of the switched-beam antenna of FIG. 5

Please refer to FIG. 6A and FIG. 6B, which are respectively schematic diagrams of a top layer and a bottom layer of the substrate SB1 of the switched-beam antenna 50, for illustrating the horizontal-polarized antennas 500_1-500_3. Remind that the substrate SB1 is a multi-layer printed circuit board and thus radiating units, reflecting units and reference ground of the horizontal-polarized antennas 500_1-500_3 can be disposed on the top layer, the bottom layer, or another inner layers. The horizontal-polarized antennas 500_1-500_3 are the same and only detail of the horizontal-polarized antennas 500_1 is given.

The horizontal-polarized antenna 500_1 comprises a driven element 501 as a dual-band dipole antenna and a reflector element 510. The driven element 501 comprises radiating units 502, 504, 506 and 508. The radiating units 502 and 506 are respectively utilized for radiating radio signals of a lower frequency band and a higher frequency band, coupled to a signal feeding line 540 (which is relative to a reference ground 542 in FIG. 6B). The radiating units 504 and 508 are utilized as the reference ground. The driven element 501 is similar to the driven element 300 of the antenna 30 of FIG. 3 and is not repeated herein. The reflector element 510 comprises a reflecting unit 512 for reflecting radio signals of the lower frequency band and a reflecting unit 514 for reflecting radio signals of the higher frequency band.

To deal with the condition of the horizontal-polarized antennas 500_1 being disposed at a 120-degree sector on the substrate SB1, the reflecting unit 512 cannot be disposed as the reflecting 322 of the antenna 30. Instead, the reflecting unit 512 comprises two portions symmetrical with respect to the center axis of the horizontal-polarized antennas 500_1, and the two portions are extending along non-collinear directions which form an angle about 120 degrees. In another embodiment, the switched-beam antenna may comprise more than three horizontal-polarized antennas and the reflecting unit for the lower frequency band may comprise two symmetrical portions forming different angle accordingly. The reflecting unit 514 is similar to the reflecting unit 324 of the antenna 30 and is not repeated herein.

Please further refer to FIG. 6A and FIG. 6B. In FIG. 6A and FIG. 6B, the signal feeding line 530 of the vertical-polarized antenna 520_1 is relative to a reference ground 532. A slot 550 is formed between the reference ground 532 and an adjacent portion of the reflecting unit 512 of the horizontal-polarized antenna 500_1. The slot 550 has a length approximate to $\frac{1}{4}\lambda_1$ and a width much smaller than $\frac{1}{4}\lambda_1$ and brings an effect that the ground current on the reference ground 532 and the ground current on the reflecting unit 512 are separated as much as possible. Therefore, isolation among vertical-polarized antennas and horizontal-polarized antennas in such a limited space is improved.

Figure 7:
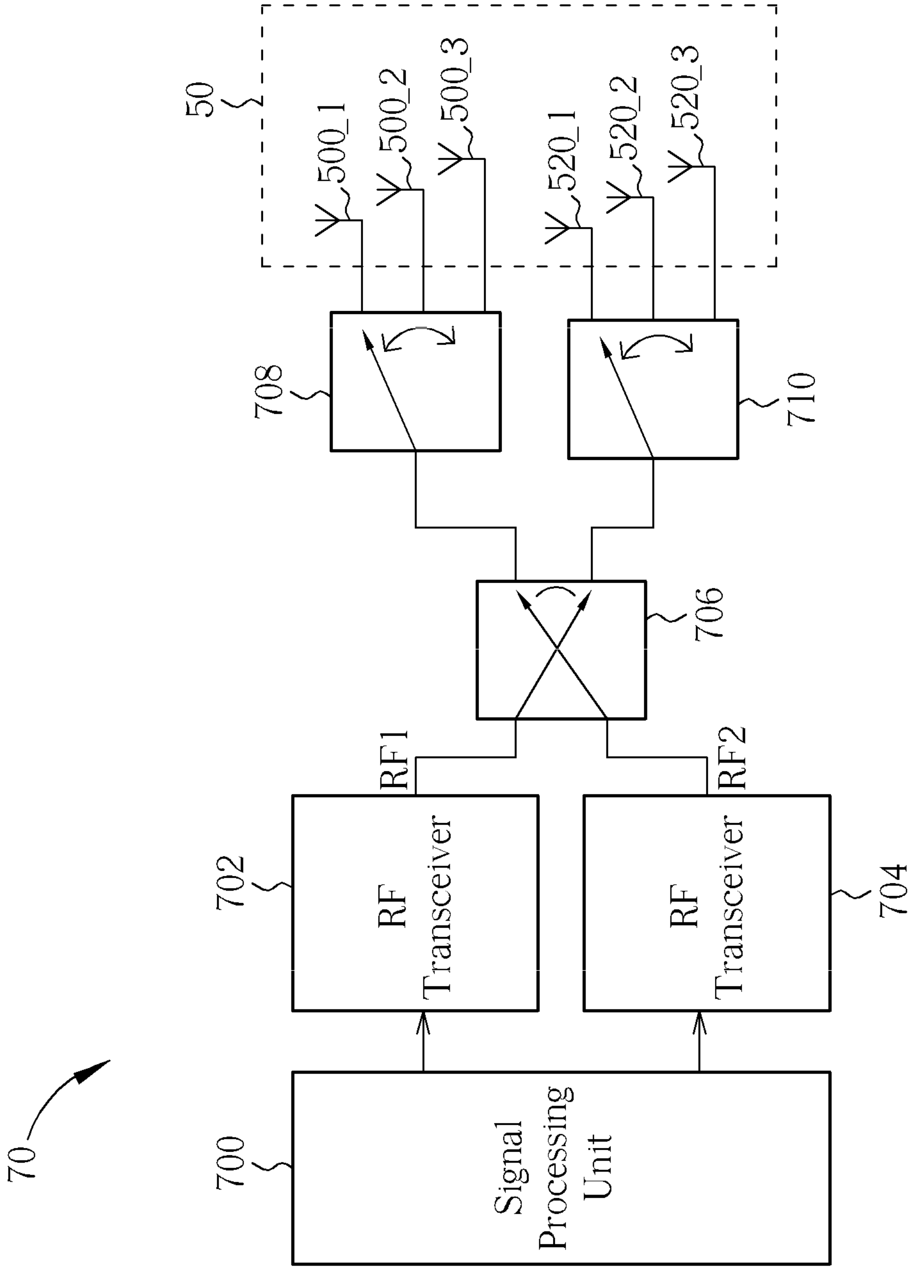
FIG. 7 is a schematic diagram of a 2×2 MIMO communication device according to an embodiment of the present invention.

The switched-beam antenna 50 can be utilized in a MIMO communication device. Please refer to FIG. 7, which is a schematic diagram of a 2×2 MIMO communication device 70 according to an embodiment of the present invention. The MIMO communication device 70 comprises a signal processing unit 700, radio frequency (RF) transceivers 702 and 704, switches 706, 708, 710 and the switched-beam antenna 50 of FIG. 5. The signal processing unit 700 is coupled to the RF transceivers 702 and 704 and is utilized for generating two different baseband signals and respectively transmitting the two different baseband signals to the RF transceivers 702 and 704. The RF transceivers 702 and 704 are utilized for processing the corresponding baseband signal and thereby generating RF signals to be transmitted, RF1 and RF2.

Figure 1:
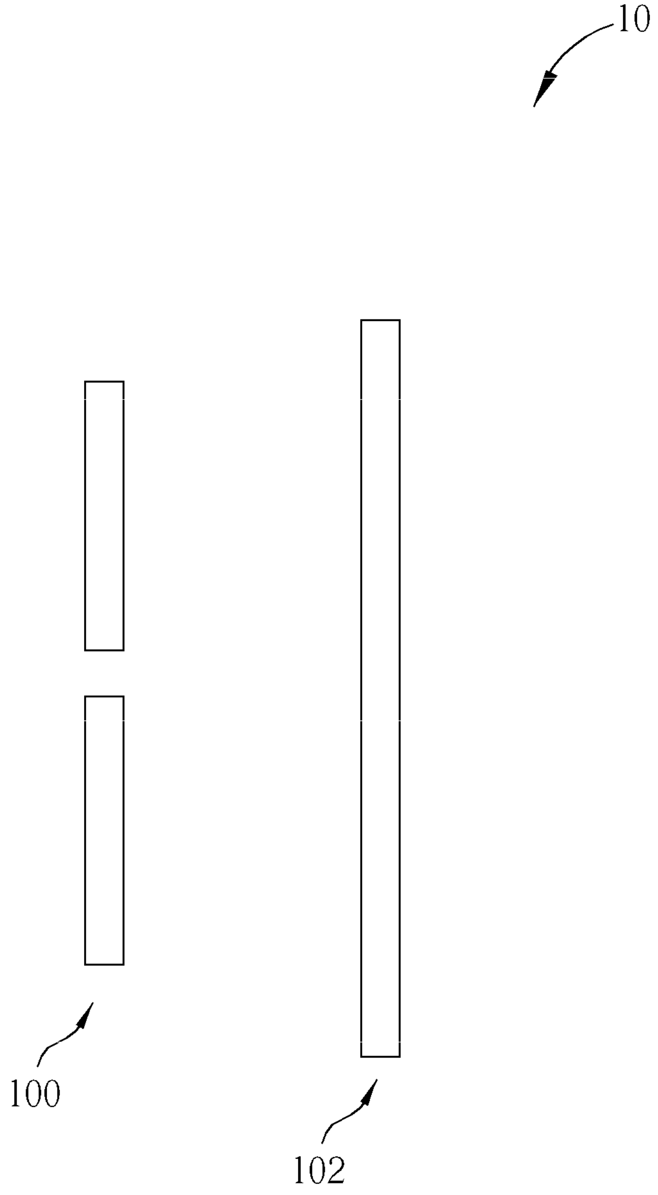
FIG. 1 PRIOR ART
FIG. 1 is a schematic diagram of a Yagi-Uda antenna according to the prior art.
Figure 2:
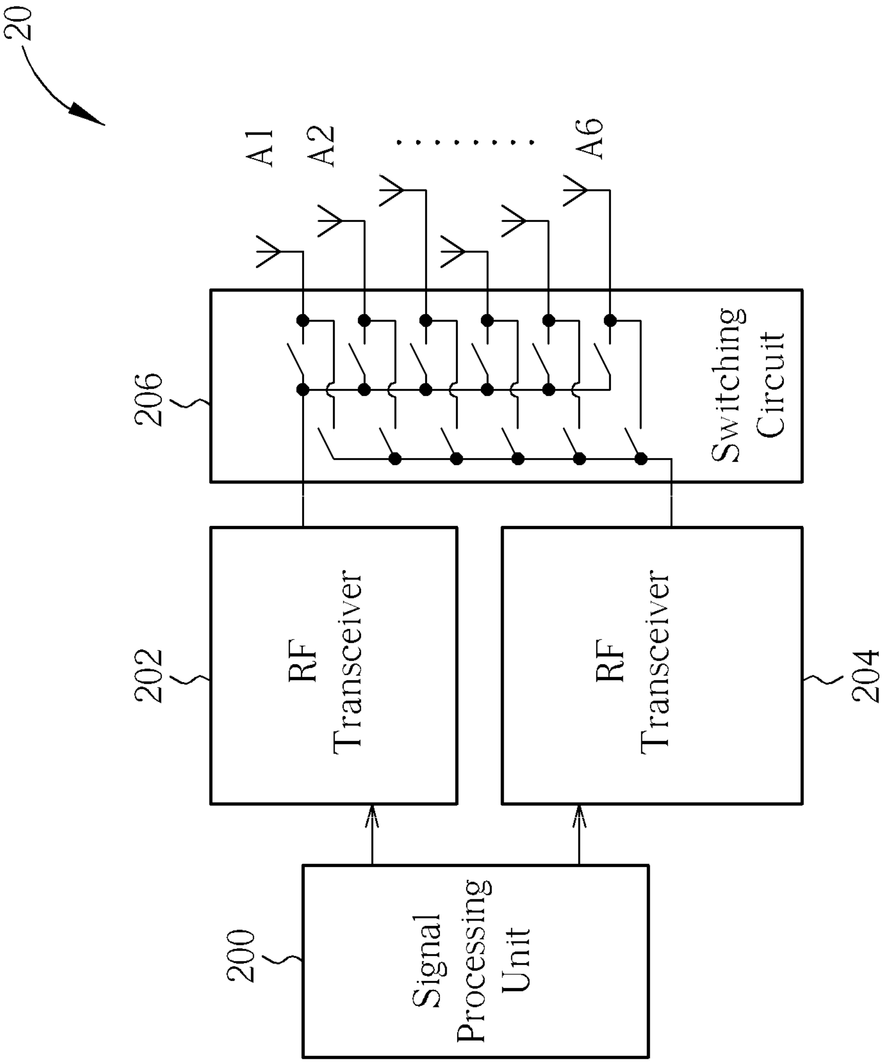
FIG. 2 PRIOR ART
FIG. 2 is a schematic diagram of a 2×2 MIMO communication device according to the prior art.

The switch 706 is a double-pole double-throw (DPDT) and is utilized for selectively coupling the RF transceiver 702 to the switch 708 or the switch 710 and also selectively coupling the RF transceiver 704 to the switch 708 or the switch 710. The switches 708 and 710 are single-pole three-throw (SP3T) switches. The switch 708 is utilized for selectively coupling the switch 706 to one of the three horizontal-polarized antennas 500_1-500_3 of the switched-beam antenna 50. The switch 710 is also utilized for selectively coupling the switch 706 to one of the three vertical-polarized antennas 520_1-520_3 of the switched-beam antenna 50. Through the DPDT switch 706 and the SP3T switches 708 and 710, each RF signal is able to be transmitted via antennas of different polarization or different radiation pattern, so that the switched-beam antenna 50 are sufficiently used. Since the SP3T switches 708 and 710 replace SPST switches as in FIG. 1, the antenna impedance matching is much easier than the situation illustrated in FIG. 1; only the system impedance is required to be considered.

The MIMO communication device 70 preferably realizes not only radiation pattern diversity but also polarization diversity because antennas of the same polarization are separated in different groups and selected by different switches. Please note that the MIMO communication device 70 is one of embodiments of the present invention, and those skilled can make alterations and modifications accordingly. For example, the switch 706 can be omitted and the RF signals RF1 and RF2 generated by the RF transceivers 702 and 704 are respectively coupled to the switches 708 and 710. That is, the RF signal RF1 or RF2 is only transmitted by the antennas of the same polarization. For a MIMO communication device having more than two RF transceivers, the DPDT switch 706 can be replaced by an nPnT (n-pole n-throw) switch; for a MIMO communication device having more than two antenna groups and more than three antennas in one group, the SP3T switches 708 and 710 can be replaced by more SPnT (single-pole n-throw) switches. In another embodiment, the horizontal-polarized antennas and the vertical-polarized antennas may not be separated by the polarization and may be mixed.

In conclusion, the antenna of the present invention for transmitting radio signals of a lower frequency and a higher frequency has high antenna directionality and gain when operating in the higher frequency band. When the dual-band antenna of the present invention is applied in a switched-beam antenna or a MIMO communication device, the benefit accompanies. In addition, the MIMO communication device of the present invention uses an nPnT switch and SPnT switches, and therefore the antenna selectivity is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna for transmitting radio signals of a first frequency and a second frequency, comprising:

a driven element, comprising two first radiating units symmetrical with respect to a center axis of the antenna and respectively extending along a first direction and a second direction opposite to the first direction, for radiating radio signals of the first frequency band, and two second radiating units symmetrical with respect to the center axis and respectively extending along the first direction and the second direction, disposed at a side of the first radiating units and respectively coupled to a corresponding first radiating unit, for radiating radio signals of the second frequency band higher than the first frequency band; and a reflector element, comprising a first reflecting unit disposed at the other side of the first radiating units, for reflecting radio signals of the first frequency band, and a second reflecting unit disposed between the first radiating units and the first reflecting unit, for reflecting radio signals of the second frequency band.

2. The antenna of claim 1, wherein the first reflecting unit and the second reflecting unit are extending along the first direction and the second direction.

3. The antenna of claim 1, wherein the first reflecting unit comprises two portions symmetrical with respect to the center axis, respectively extending along a third direction and a fourth direction which are non-collinear.

4. The antenna of claim 1, wherein each first radiating unit comprises two portions and one of the two portions far from the center axis has a width larger than the other portion close to the center axis has.

5. The antenna of claim 1, wherein the first reflecting unit and the second reflecting unit are coupled.

6. The antenna of claim 1, wherein the first reflecting unit and the second reflecting unit are not coupled.

7. The antenna of claim 1, wherein the first reflecting unit, the second reflecting unit, one of the first radiating units and one of the second radiating units are coupled.

8. The antenna of claim 1, wherein the first reflecting unit comprises two portions symmetrical with respect to the center axis and an end of each portion far from the center axis has a width larger than the other end of the portion close to the center axis has.

9. A multi-input multi-output (MIMO) communication device comprising:

a signal processing unit for processing baseband signals;

a plurality of radio frequency (RF) transceivers coupled to the signal processing unit, for processing the baseband signals and generating RF signals;

a switched-beam antenna comprising:

a plurality of horizontal-polarized antennas disposed on a first substrate, equally dividing a circle into a plurality of sectors; and a plurality of vertical-polarized antennas respectively disposed on a plurality of substrates which are perpendicularly combined with the first substrate and spaced apart by the first substrate, the plurality of vertical-polarized antennas interlaced with the plurality of horizontal-polarized antennas, wherein the plurality of horizontal-polarized antennas and the plurality of vertical-polarized antennas are divided into a plurality of antenna groups; and a plurality of first switches respectively coupled to the plurality of RF transceivers, each first switch for selectively coupling a corresponding one of the plurality of RF transceivers to an antenna in one of the plurality of antenna groups.

10. The MIMO communication device of claim 9 further comprising a second switch coupled between the plurality of RF transceivers and the plurality of first switches, for selectively coupling one of the plurality of RF transceivers to one of the plurality of first switches.

11. The MIMO communication device of claim 9, wherein the plurality of horizontal-polarized antennas and the plurality of vertical-polarized antennas are divided according to polarization direction and each antenna group comprises antennas of the same polarization.

12. The MIMO communication device of claim 9, wherein each antenna of the switched-beam antenna, whatever the antenna is the horizontal-polarized antenna or the vertical-polarized antenna, comprises:

a driven element, comprising two first radiating units symmetrical with respect to a center axis of the antenna and respectively extending along a first direction and a second direction opposite to the first direction, for radiating radio signals of a first frequency band, and two second radiating units symmetrical with respect to the center axis and respectively extending along the first direction and the second direction, disposed at a side of the first radiating units and respectively coupled to a corresponding first radiating unit, for radiating radio signals of a second frequency band higher than the first frequency band; and a reflector element, comprising a first reflecting unit disposed at the other side of the first radiating units, for reflecting radio signals of the first frequency band, and a second reflecting unit disposed between the first radiating units and the first reflecting unit, for reflecting radio signals of the second frequency band.

13. The MIMO communication device of claim 12, wherein the reference ground of a signal feeding line used for each vertical-polarized antenna is separated from the first reflecting unit of an adjacent horizontal-polarized antenna by a slot having a length approximate to a quarter wavelength of a center frequency of the first frequency band.

14. The MIMO communication device of claim 12, wherein in each vertical-polarized antenna, the first reflecting unit and the second reflecting unit of are coupled.

15. The MIMO communication device of claim 12, wherein in each vertical-polarized antenna, the first reflecting unit and the second reflecting unit are not coupled.

16. The MIMO communication device of claim 12, wherein in each vertical-polarized antenna, the first reflecting unit, the second reflecting unit, one of the first radiating units and one of the second radiating units are coupled.

17. The MIMO communication device of claim 12, wherein in each vertical-polarized antenna, the first reflecting unit comprises two portions symmetrical with respect to the center axis and an end of each portion far from the center axis has a width larger than the other end of the portion close to the center axis has.

* * * * *